March 11, 1952 — L. LEE, II — 2,588,547
FUEL CONTROL SYSTEM
Filed Jan. 27, 1948 — 2 SHEETS—SHEET 1
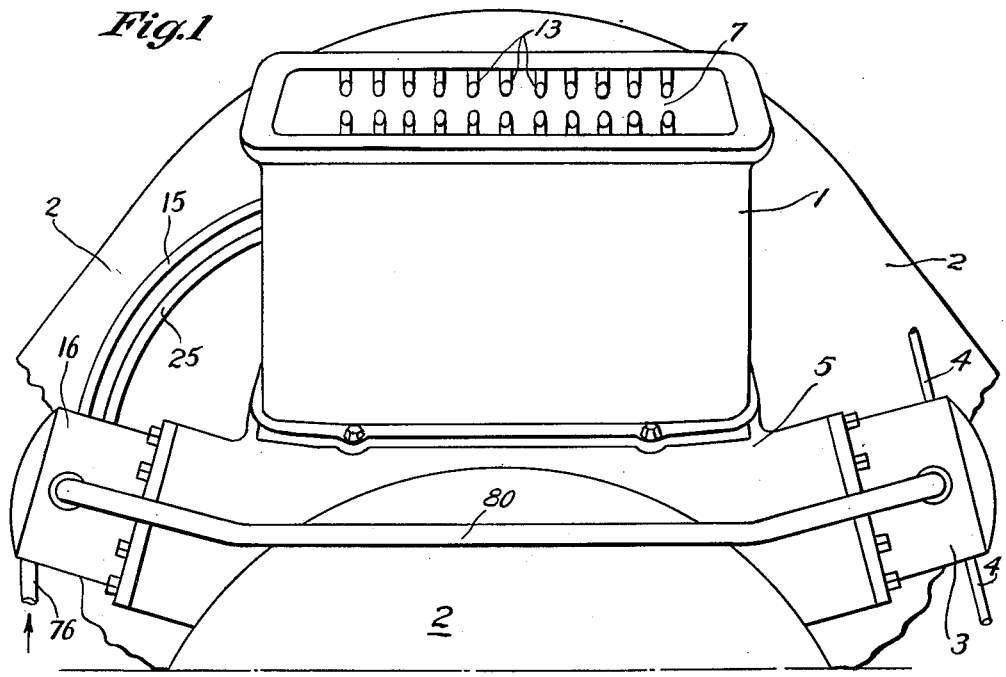
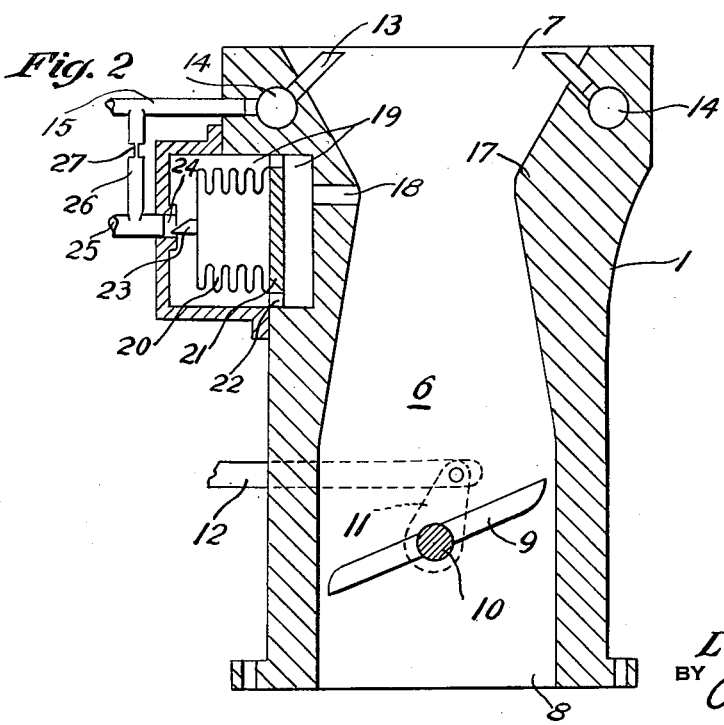
INVENTOR
Leighton Lee II.
BY
ATTORNEY March 11, 1952   L. LEE, II   2,588,547
FUEL CONTROL SYSTEM
Filed Jan. 27, 1948   2 SHEETS—SHEET 2
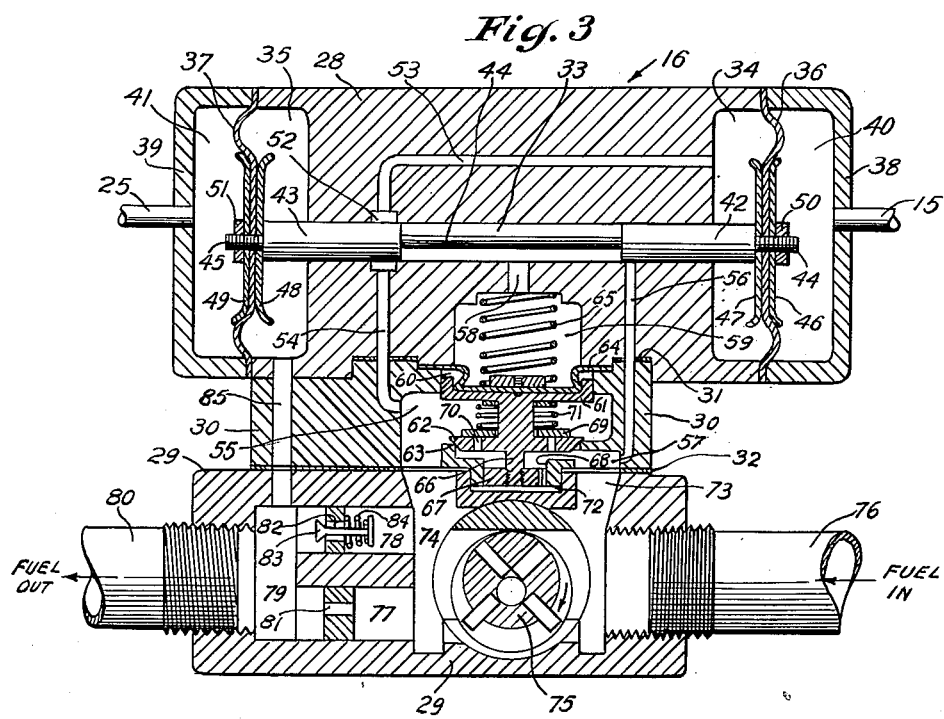
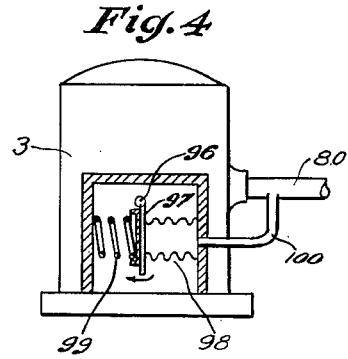
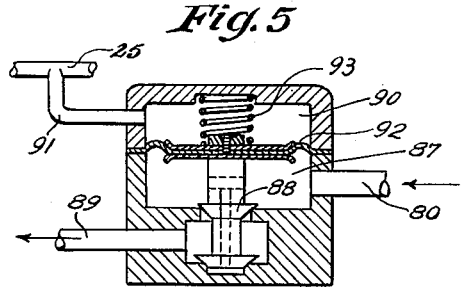
INVENTOR.
Leighton Lee II.
BY
ATTORNEY

UNITED STATES PATENT OFFICE 2,588,547

FUEL CONTROL SYSTEM

Leighton Lee, II, Rocky Hill, Conn., assignor to Niles-Bement-Pond Company, West Hartford, Conn., a corporation of New Jersey Application January 27, 1948, Serial No. 4,610

14 Claims. (Cl. 123—119)

This invention pertains to fuel controls for internal combustion engines and more particularly has reference to such controls which are constructed and mounted on the engine in the form of units separate from the combustion air supply system of the engine. This invention is especially applicable to engines in which the fuel is injected directly into the engine cylinders, but may also be applied to engines wherein the fuel is fed into the air supply prior to its entrance into the cylinders. The description of this invention is based upon its application to an aircraft engine, although it is equally applicable to internal combustion engines for motor vehicles and other uses.

Heretofore fuel control devices for internal combustion engines have been constructed as more or less integral parts of the carburetor or charge forming apparatus and therefore could not be repaired or replaced in case of trouble therein without more or less completely dismantling or replacing the whole carburetor or charge forming apparatus. Such procedure is both time consuming and expensive and it would obviously be an advantage if fuel controls for internal combustion engines, which are the most delicate and complicated parts of the carburetion or charging forming apparatus, could be built and supplied as separate, self-contained units which could be easily installed on the engine without disturbing the other parts of the carburetor or charge forming apparatus. It would also be advantageous if these controls could be simplified and made more accurate and reliable in operation.

It is accordingly an object of this invention to provide a fuel control device for internal combustion engines in the form of a self-contained unit, separate from the other parts of the carburetor or charging forming apparatus of the engine, and which is adapted to be separately mounted on the engine.

Another object of this invention is to provide a separate fuel control unit which includes a fuel transfer pump and a fuel jet system in one unitary structure that can be mounted on the engine as a unit and which, in association with the air supply and fuel injection pump (or load compensating valve), constitutes the entire charge forming apparatus or carburetor for the engine.

A further object of this invention is to provide a fuel control unit as above, wherein the fuel flow is regulated by a variable pressure on each side of the jet system, which pressures are so coordinated as to produce a fuel metering head that is proportional to the rate of air flow to the engine.

Still another object of this invention is to provide a fuel control unit as above, wherein the fuel flow controlling means varies the fuel pressure differential across the fuel jet system in accordance with the net balance between the said fuel pressure differential and a selected air pressure differential in the air supply system.

Still another object of this invention is to provide a fuel control unit as above, wherein the variation in the transfer pump discharge pressure, corresponding to one or more fixed conditions of operation, is substantially constant, regardless of variations in one or more other conditions of operation.

With these and other objects in view which may be incident to my improvements, my invention consists in the combination and arrangement of elements hereinafter described and illustrated in the accompanying drawings in which Fig. 1 is a fragmentary side elevational view, largely diagrammatic, showing my improved fuel control unit as applied to an aircraft engine; Fig. 2 is a transverse vertical section of the air supply unit shown in Fig. 1; Fig. 3 is a vertical section, largely diagrammatic, of a fuel control mechanism in accordance with my invention; Fig. 4 is a diagrammatic side elevation, partly in section, of a fuel injection pump which may be employed in connection with my improved fuel control unit; and Fig. 5 is a vertical section of a load compensator valve which may be employed in connection with my improved fuel control unit when the fuel is delivered to the air supply unit of a pressure feed carburetor.

Referring to Figs. 1 and 2 of the drawings, the reference numeral 1 denotes an air supply unit for a multi-cylinder aircraft engine 2 in which the fuel is injected directly into the cylinders (not shown) by a conventional multi-barrel fuel injection pump 3 having a separate barrel of the pump conduit 4 connecting each barrel of the pump with a cylinder of the engine. Air supply unit 1 and pump 3 are each connected to the air intake manifold 5 of engine 2, as shown in Fig. 1. Air supply unit 1 has extending thru it an air passage 6 provided at its upper end with an enlarged air inlet or scoop 7, and at its lower end with an outlet 8 adapted to communicate with the adjacent part of the intake manifold 5. Located in air passage 6 near the outlet 8 is a throttle 9 pivoted on a shaft 10 which is adapted to be turned by a crank 11 connected by a link 12 to the pilot's throttle operating lever (not shown), by means of which the pilot controls the opening of the throttle and thereby the operation of the engine.

Around the entrance to the air inlet 7 is a series of air impact tubes 13 which are open at their upper ends and transmit air under impact pressure to a collector ring passage 14 and thence to a conduit 15 which communicates with fuel control unit 16. In the air passage 6, somewhat below inlet 7, is a restricted throat or Venturi portion 17 which communicates thru a passage 18 with an enclosed chamber 19 housing a device which compensates for changes in the barometric pressure and temperature of the air entering inlet 7 in the conventional manner. This device consists essentially of a sealed bellows 20 which is filled with a pressure and temperature responsive fluid which causes the bellows to expand and contract in proportion to variations in barometric pressure and temperature of the air entering inlet 7. Bellows 20 is mounted on a fixed partition 21 in chamber 19 having holes 22 therethru for the passage of air through chamber 19. Attached to the free end of bellows 20 is a contoured valve 23 which is adapted to be moved by the expansion and contraction of the bellows in port 24 so as to control the flow of air therethru and thru chamber 19. A conduit 25 connects port 24 with fuel control unit 16, and a cross conduit 26 connects conduits 25 and 15 thru a calibrated restriction 27.

It is apparent from the foregoing description that the main air supply to the engine passing through passage 6 will have a higher velocity and corresponding lower pressure at Venturi throat 17 than it has at air inlet 7 and that this pressure differential is proportional to the velocity of this air flow. It is also apparent that a portion of the air entering inlet 7 will flow thru impact tubes 13, collector ring 14, conduits 15 and 26, restriction 27, conduit 25, port 24, chamber 19 and passage 18 to passage 6. As air impact tubes 13 are pointed upstream, the air entering these tubes will, owing to impact effect, be at a higher pressure than the air passing thru inlet 7, in proportion to the velocity of air flow thru passage 6. Also the pressure in passage 18 and chamber 19 will be substantially the same as the pressure in Venturi throat 17 which is less than the pressure of the air at inlet 7 in proportion to the velocity of air flow through passage 6. Owing to the lower pressure in chamber 19 and restriction 27, the pressure in conduit 15 is always greater than the pressure in conduit 25 and this pressure differential is proportional to the velocity of air flowing thru passage 6. Furthermore, since the action of bellows 20 and valve 23 compensates for variations in the barometric pressure and temperature (i. e., density) of the air entering inlet 7, the pressure differential between conduits 15 and 25 is proportional to the rate of mass flow of air in passage 6.

Turning now to Fig. 3 which shows in diagrammatic vertical section the construction of my improved fuel control unit 16, it will be seen that this unit comprises three principal parts, viz: an upper cylindrical member 28 which contains the pilot valve and actuating mechanism; a lower cylindrical member 29 which contains the fuel transfer pump and fuel jet system; and an intermediate connecting member 30 which contains the load compensating relief valve and actuating mechanism. Parts 28, 29 and 30 are held in fluid-tight contact by any conventional means, such as flange bolts (not shown), and interposed gaskets 31 and 32.

Upper member 28 has a longitudinal axial bore 33 extending throughout its length and communicating at each end of member 28 with recessed chambers 34 and 35 which are closed by flexible diaphragms 36 and 37 held in fluid-tight contact against the ends of member 28 by caps 38 and 39. These caps are held in assembled position by any conventional means, such as flange bolts (not shown), and are each recessed to form chambers 40 and 41 which communicate respectively with conduits 15 and 25. Slidably mounted in bore 33 is a spool pilot valve which comprises two cylindrical valve members 42 and 43 connected to each other by a tie rod 44 of smaller diameter. Each of the valve members 42 and 43 carries at its free end a threaded stem 44—45, on each of which are mounted a pair of metal discs 46—47, and 48—49 which embrace the central portions of diaphragms 36 and 37 respectively. Each pair of discs is tightly clamped to the end of its valve member 42 or 43 by threaded nuts 50 and 51 on stems 44 and 45.

Near the left end of bore 33 is an annular valve port 52 which communicates by a passage 53 with chamber 34 and by a passage 54 with a chamber 55 in member 30. Port 52 is adapted to communicate with the central portion of bore 33 when valve member 43 is moved to the left and permits uninterrupted communication between passages 53 and 54 around valve 43. A similar passage 56 on the right hand side of member 28 leads from bore 33 to a chamber 57 in member 30 and is adapted to establish communication between the central portion of bore 33 when valve member 42 is moved to the right. A fourth passage 58 leads from bore 33 to a chamber 59 in the lower central portion of member 28.

The upper wall of member 30 has a central bore 60 in which is slidably mounted a piston 61 integral with a valve 62 that coacts with a seat 63 in a central wall of member 30. Attached to the upper side of piston 61 is a flexible diaphragm 64, the outer edge of which is firmly clamped between members 28 and 30 so as to form an airtight partition between chambers 55 and 59. A spring 65 in chamber 59 is mounted on diaphragm 64 and biases valve 62 to closed position on its seat 63. Valve 62 has a downwardly extending stem 66 to which is attached a piston 67 slidably mounted in a bore 68 in the lower wall of member 30. Slidably mounted on valve 62 is an annular disc valve 69 which seats on the upper side of valve 62 and is adapted to open and close ports 70 in valve 62. A spring 71 seats on valve 69 and keeps this valve closed at all times, except in the event that the pump 75 (mentioned below) should fail to operate, in which case the fuel can be pumped past valve 62 by increasing the pump inlet pressure.

In the upper wall of member 29 is a circular recess 72 which is adapted to receive an annular flange depending from member 30 and form a chamber for piston 67. Centrally disposed in member 29 are chambers 73 and 74 which are respectively in communication with chambers 57 and 55 in member 30 and which form the inlet and outlet chambers respectively for a rotary impeller pump 75 with radially movable vanes, which is geared to the engine 2. Chamber 73 is supplied with fuel by conduit 76 from a fuel supply tank (not shown), and chamber 74 communicates through passages 77 and 78 and chamber 79 with an outlet conduit 80 that connects the fuel control unit 16 with the fuel injection pump 3 (see Fig. 1). Mounted in passage 77 is a fixed metering orifice 81 and in passage 78 a variable metering orifice 82, which together form the jet system of fuel control unit 16. The flow of fuel through orifice 82 is regulated by a contoured valve 83 which is biased toward closed position by a spring 84. Valve 83 does not commence to open until a predetermined pressure differential exists between chambers 74 and 79 and thereafter opens progressively as this pressure differential increases. Therefore the flow of fuel through orifice 82 supplements that thru orifice 81 for higher power outputs of the engine 2. A passage 85 maintains constant communication between chambers 79 and 35.

Referring now to Fig. 4, the fuel injection pump 3 has control mechanism whereby its output capacity is coordinated with the pressure in fuel supply line 80 from control unit 16. While my fuel control unit may be used with any type of fuel injection pump wherein the output capacity of the pump is responsive to the pressure of the metered fuel supplied to the pump, the pump indicated in Fig. 4 is of the type wherein a rotary valve member geared to the engine and centrally disposed among the pump barrels, successively controls the fuel discharged from each barrel by opening and closing the inlet or discharge port thereof, the amount of fuel delivered per stroke from each barrel being regulated by reciprocally varying the position of the rotary valve member, as for example the fuel pump disclosed in U. S. Patent 2,142,086, January 3, 1939.

The control mechanism illustrated in Fig. 4 comprises a rocker shaft 96 which is mechanically connected to the central rotary valve member of the pump so that a rotation of the shaft in one direction (e. g., clockwise) lowers the valve member and increases the pump output per stroke, and vice versa. Fixed to shaft 96 is an arm 97 which is embraced between a flexible bellows 98 and an opposing spring 99 so that, when the bellows is extended by an increase in its internal pressure, arm 97 is moved to the left in a clockwise direction, and vice versa. The interior of bellows 98 communicates thru a conduit 100 with fuel supply line 80 so that the bellows is actuated by variations in pressure in line 80 which supplies metered fuel to pump 3. It is thus apparent that whenever there is a rise in pressure in line 80, shaft 96 will be rotated in a clockwise direction which lowers the central valve member of pump 3 and increases its output capacity per stroke, and vice versa. By a proper design of its rotary valve member, the output capacity of pump 3 can be coordinated with the pressure in fuel line 80.

When it is desired to use my fuel control unit with an engine having a pressure feed carburetor, instead of a fuel injection system, the load compensator valve shown diagrammatically in Fig. 5 is substituted for the fuel injection pump indicated in Fig. 4. This valve is located at the end of the fuel supply line just before the fuel is discharged into the main air passage of the carburetor and its function is to maintain the pressure at the discharge end of the fuel line at a predetermined constant value irrespective of variations in pressure in the carburetor air passage and in barometric pressure. The load compensator valve comprises a chamber 87 communicating with the fuel inlet conduit 80 and, thru a balanced valve 88, with a fuel discharge conduit 89 leading into the main air passage of the carburetor. Above chamber 87 is another chamber 90 which communicates thru a conduit 91 with air conduit 25 so that the air in chamber 90 is subject to variations in barometric pressure. Chamber 90 is sealed from chamber 87 by a flexible diaphragm 92 which is mounted at its center on valve 88 and secured at its outer edge between the walls of chambers 87 and 90. A spring 93 in chamber 90 is seated on diaphragm 92 and biases valve 88 toward closed position in opposition to the fuel pressure in chamber 87. Spring 93 is calibrated to maintain a constant pressure in chamber 87 and by varying the opening of valve 88 with fluctuations in pressure in fuel line 89 due to variations in air pressure in the carburetor air passage and in barometric pressure in chamber 90.

Referring again to Figs. 2 and 3, it will be seen that the pressure in chamber 40 (Fig. 3) is the same as the air pressure in impact tubes 13 (Fig. 2), while the pressure in chamber 41 is proportional to the pressure in passage 18 and chamber 19, compensated for variations in air density due to changes of barometric pressure and temperature. Hence, the pressure differential between chambers 40 and 41 is proportional to the pressure differential between the main air inlet 7 and Venturi throat 17 which in turn is a function of the rate of mass flow of the air supply to the engine. Accordingly, an increase in rate of mass air flow to the engine will produce a force, proportional to such increase, which acts on valves 42 and 43 thru diaphragms 36 and 37, and tends to move these valves to the left, and vice versa. Opposing this air pressure differential force is a fuel pressure differential force, consisting of the difference in the fuel pressures in chambers 34 and 35, which act on the opposite sides of diaphragms 36 and 37 from the air pressure and tend to move valves 42 and 43 to the right whenever the flow of fuel thru the jet system 81—82 increases, since the pressure in chamber 34, being the same as the pump discharge pressure in chamber 55, is greater than the pressure in chamber 35 (=79), by the pressure drop across the jet system which is proportional to the flow of fuel therethru.

When spool valves 42 and 43 are moved to the left from the mid-position shown in Fig. 3, passage 54 is connected to bore 33 while passage 56 is cut off therefrom, so that the pressure in bore 33 and chamber 59 will be the same as the pump discharge pressure in chamber 74. Conversely, when spool valves 42 and 43 are moved to the right, passage 56 is connected to bore 33 while passage 54 is cut off therefrom, so that the pressure in bore 33 and chamber 59 will be the same as the pump inlet pressure in chamber 73. The pressure in chamber 59, which controls the opening and closing of valve 62, will vary from the pump discharge pressure to the lower pump inlet pressure, depending upon the position of spool valves 42 and 43 which in turn depends upon the imbalance between the air pressure differential force and the fuel pressure differential force described above.

Since the area of piston 61 is greater than the area of valve 62 exposed to the pump discharge pressure in chamber 55, that pressure, aided by the pump inlet pressure in chamber 57, will tend to lift valve 62 from its seat 63 against the force of spring 65 and the pressure in chamber 59. The force of spring 65 is such that the valve 62 will open whenever the pressure in chamber 59 is the same as the lower pump inlet pressure in chamber 73 and will close whenever the pressure in chamber 59 rises to the pump discharge pressure in chamber 74. Whenever valve 62 is open, a portion of the fuel discharged by pump 75 returns to the pump inlet chamber 73, with a corresponding reduction in the pressure in chamber 74, and only that part of the total fuel discharged by the pump which does not return to chamber 73 passes thru jets 81 and/or 82. Hence the pressure in pump discharge chamber 74 and the rate of fuel passing thru the jet system depends at all times upon the amount of opening of valve 62, which in turn is controlled by the imbalance between the air pressure differential and fuel pressure differential forces described above. In other words, the rate of fuel flow is made dependent upon and proportional to the rate of mass air flow to the engine.

With the spool valves 42 and 43 in their central or neutral position, as shown in Fig. 3, passages 54 and 56 will be cut off from bore 33 and the pressure in chamber 34 will be maintained at the pump discharge pressure (in 74) by passages 54—52—53. If now a slight decrease in pump discharge pressure occurs while other operating conditions remain constant, its effect will be to decrease the fuel pressure on diaphragm 36 and move the spool valves 42 and 43 slightly to the left. This movement of the valve 52 opens communication from passage 54 to bore 33 and chamber 59 and admits fuel at pump discharge pressure to act on piston 61 and valve 62, so that the latter moves toward its closed position. The closing movement of valve 62 causes an increase in the pump discharge pressure in chamber 74 which builds up the pressure in chamber 34. As soon as the pressure in chamber 34 reaches its previous amount, valve 52 will be returned to its former central position. Conversely, any increase in pump discharge pressure will cause the valve 42 to move to the right and valve 62 to move toward its open position, thus reducing this pressure until it reaches its former amount when valve 42 will be returned to its former central position.

In prior art pressure regulating relief valves for pumps, it has been customary to connect the regulating spring directly to the valve itself. When the relief valve is so arranged, it is necessary, because of the rate of the spring, for the pump discharge pressure to increase slightly in order to open the valve an additional amount. Therefore, if the pump speed varies over a wide range while the flow remains constant, the pump discharge pressure will likewise vary, although it is said to be nominally constant. This variation of pump discharge pressure with speed at a given flow thru the discharge line is termed the "regulation" of the pump.

In the device disclosed in this application, the regulation of the pump is substantially zero, since, under steady conditions, the position of spool valves 42 and 43 is the same, regardless of the position of piston 61. Therefore any deviation of the pump discharge pressure from its normal value causes an operation of the relief valve 62, and the pump discharge pressure is returned to exactly the same value by the operation of the relief valve. Accordingly, the regulation of the pump discharge pressure when controlled by a valve of the type herein disclosed is substantially zero.

From what has been disclosed above, it is apparent that I have provided in one compact unit which may be installed on an internal combustion engine, separate from its air supply system, a device which supplies fuel under pressure to either a fuel injection pump, or to the load compensator valve of a carburetor, of the engine, at a rate of flow which is proportional to the rate of mass air flow to the engine and with a "regulation" that is substantially zero.

While I have shown and described the preferred embodiment of my invention, I desire it to be understood that I do not limit myself to the details of construction shown by way of illustration as these may be changed and modified by those skilled in the art without departing from the spirit of my invention nor exceeding the scope of the appended claims.

I claim as my invention:

1. In an internal combustion engine having an air supply passage, with means therein for producing an air pressure differential proportional to the rate of air flow thru said passage, and a fuel conduit for supplying fuel to said engine; a fuel control device, mounted on said engine as a single package unit separate from said air passage and including a portion of said fuel conduit, said device comprising a fixed fuel metering restriction for metering fuel flowing to said engine, and means for controlling the flow of fuel therethru in response to the said air pressure differential.

2. A fuel control device as in claim 1 in which the fuel flow controlling means includes a fuel pump driven by said engine.

3. A fuel control device as in claim 1 in which the fuel flow controlling means varies the fuel pressure differential across said metering restriction in accordance with the imbalance between said fuel pressure differential and the air pressure differential.

4. A fuel control device as in claim 3 in which the fuel flow controlling means includes a fuel pump driven by said engine and a relief valve for controlling the pump discharge pressure.

5. A fuel control device as in claim 1 in which the fuel flow controlling means includes a fuel pump driven by said engine and a load compensating relief valve for controlling the pump discharge pressure with a regulation substantially zero.

6. In an internal combustion engine having an air supply passage with means therein for producing an air pressure differential proportional to the rate of air flow thru said passage; a fuel supply system comprising a fuel injection pump and a fuel conduit for supplying fuel to said pump, a fuel control device mounted on said engine as a unit separate from said air passage and said pump, and having means responsive to said air pressure differential for controlling the flow of fuel through said conduit to said pump, and means responsive to the pressure in said conduit between said control device and said pump for controlling the delivery of said pump.

7. A fuel supply system as in claim 6 in which the fuel control device includes a fuel metering restriction in said conduit and means for controlling the fuel flow through said restriction in response to the said air pressure differential.

8. A fuel supply system as in claim 6 wherein the fuel control device includes a fuel metering restriction in said conduit and means for varying the fuel pressure differential across said restriction in accordance with the imbalance between said fuel pressure differential and said air pressure differential.

9. A fuel supply system according to claim 6 in which the fuel control device includes a fuel pump driven by said engine and a relief valve for controlling said pump discharge pressure.

10. In an internal combustion engine having an air supply passage with means therein for producing an air pressure differential proportional to the rate of air flow thru said passage; a fuel supply system comprising a fuel conduit for supplying fuel to said air passage, a fuel control device, mounted on said engine as a single unit separate from said air passage, and having means responsive to said air pressure differential for controlling the flow of fuel through said conduit, and a discharge valve in said conduit for controlling the pressure therein on the downstream side of said fuel control device.

11. A fuel supply system as in claim 10 in which the fuel control device includes a fuel metering restriction and means for controlling the fuel flow through said restriction in response to the said air pressure differential.

12. A fuel supply system as in claim 10 wherein the fuel control device includes a fuel metering restriction and means for varying the fuel pressure differential across said restriction in accordance with the imbalance between said fuel pressure differential and said air pressure differential.

13. A fuel supply system as in claim 10 in which the fuel control device includes a fuel pump driven by the engine and a relief valve for controlling the discharge pressure of said pump.

14. A fuel supply system as in claim 10 in which the fuel control device includes a fuel pump driven by the engine and a load compensating relief valve for controlling the discharge pressure of said pump with a substantially zero regulation.

LEIGHTON LEE, II.

REFERENCES CITED

The following references are of record in the file of this patent:

UNITED STATES PATENTS

| Number | Name | Date |
|---|---|---|
| 2,273,670 | Udale | Feb. 17, 1942 |
| 2,384,282 | Chandler | Sept. 4, 1945 |
| 2,447,268 | Evans | Aug. 17, 1948 |